(12) United States Patent
Kent et al.

(10) Patent No.: US 10,931,382 B2
(45) Date of Patent: Feb. 23, 2021

(54) TECHNIQUES FOR TRANSMITTING AND/OR RECEIVING AN OPTICAL SIGNAL (71) Applicant: BAE SYSTEMS plc, London (GB)

(72) Inventors: Lionel William John Kent, Chelmsford (GB); Leslie Charles Laycock, Chelmsford (GB); Giovanni Giuliano, Glasgow Strathelyde (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 16/494,966

(22) PCT Filed: Mar. 21, 2018

(86) PCT No.: PCT/GB2018/050737
§ 371 (c)(1),
(2) Date: Sep. 17, 2019

(87) PCT Pub. No.: WO2018/178635
PCT Pub. Date: Oct. 4, 2018

(65) Prior Publication Data
US 2020/0274623 A1 Aug. 27, 2020

(30) Foreign Application Priority Data

Mar. 28, 2017 (EP) ..................................... 17275042
Mar. 28, 2017 (GB) ..................................... 1704940

(51) Int. Cl.
*H04B 13/02* (2006.01)
*G01N 29/24* (2006.01)
*H04B 10/11* (2013.01)
*H04B 11/00* (2006.01)

(52) U.S. Cl.
CPC ......... *H04B 13/02* (2013.01); *G01N 29/2425* (2013.01); *H04B 10/11* (2013.01); *H04B 11/00* (2013.01); *G01N 2291/106* (2013.01)

(58) Field of Classification Search
CPC combination set(s) only.
See application file for complete search history.

(56) References Cited

U.S. PATENT DOCUMENTS 8,750,727 B1* 6/2014 Hiller ..................... H04B 13/02
398/212
2008/0279558 A1* 11/2008 Capron ................ H04B 10/112
398/118

(Continued)

FOREIGN PATENT DOCUMENTS

WO 9111061 A1 7/1991
WO 2010151702 A1 12/2010

(Continued)

OTHER PUBLICATIONS

Hiroyuki Masuyama,"Generation of Bessel Beam from Equiamplitude-Driven Annular Transducer Array Consisting of a Few Elements",Jpn. J. Appl. Phys. vol. 38 (1999), Pub Date:Jan. 29, 1999, pp. 3081-3083.*
J. M. Buick," Application of the acousto-optic effect to pressure measurements in ultrasound fields in water using a laser vibrometer" , Review of Scientific Instruments 75, 3203 (2004),vol. 75, No. 10,Pub Date: Sep. 20, 2004,pp. 3204-3206.*
Hiroyuki Masuyama,"Generation of Bessel Beam from Equiamplitude-Driven Annular Transducer Array Consisting of a Few Elennents",Jpn. J. Appl. Phys. vol. 38 (1999), Pub Date:Jan. 29, 1999, pp. 3081-3083.*

(Continued)

*Primary Examiner* — Omar S Ismail
(74) *Attorney, Agent, or Firm* — Finch & Maloney PLLC (57) ABSTRACT According to a first aspect of the present invention, there is provided a method for transmitting and/or receiving an optical signal through a fluid, the method comprising: using a pressure wave to cause a change in refractive index in the fluid, the change in refractive index causing a waveguide to be formed; and transmitting and/or receiving the optical signal through the waveguide.

20 Claims, 8 Drawing Sheets

(56) References Cited

U.S. PATENT DOCUMENTS

| | | | |
|---|---|---|---|
| 2012/0007005 A1* | 1/2012 | Schunk | H01L 31/167 |
| | | | 250/551 |
| 2013/0148196 A1* | 6/2013 | Arnold | G02F 1/11 |
| | | | 359/385 |
| 2013/0308957 A1 | 11/2013 | Iwamoto et al. | |
| 2014/0327548 A1* | 11/2014 | Maisonnier | G01N 33/1886 |
| | | | 340/603 |
| 2015/0016826 A1 | 1/2015 | Segev et al. | |
| 2017/0257173 A1* | 9/2017 | Harris | H04B 10/112 |

FOREIGN PATENT DOCUMENTS

| | | |
|---|---|---|
| WO | 2013061578 A1 | 4/2015 |
| WO | 2018178635 A1 | 10/2018 |

OTHER PUBLICATIONS

International Search Report and Written Opinion received for PCT Application No. PCT/GB2018/050737, dated Jun. 13, 2018. 11 pages.
GB Search Report under Section 17(5) received for GB Application No. 1704940.4 dated Sep. 7, 2017. 3 pages.
Extended European Search Report received for EP Application No. 17275042.4, dated Oct. 13, 2017. 4 pages.
Pitts, et al., "Optical Phase Contrast Measurement of Ultrasonic Fields," IEEE Transactions on Ultrasonics, Ferroelectrics and Frequency Control, vol. 48, No. 6. Nov. 2001. pp. 1686-1694.
International Preliminary Report on Patentability received for PCT Application No. PCT/GB2018/050737, dated Oct. 10, 2019. 6 pages.

* cited by examiner

TECHNIQUES FOR TRANSMITTING AND/OR RECEIVING AN OPTICAL SIGNAL

The present invention relates generally to a method for transmitting and/or receiving an optical signal, and in particular to transmitting and/or receiving an optical signal through a fluid, such as a liquid. The present invention also relates to an associated system for transmitting and/or receiving an optical signal, and more specifically transmitting and/or receiving an optical signal through a fluid, such as a liquid.

It is sometimes required to form some sort of link or connection between a transmitter and receiver located within a fluid. For example, it may be necessary to establish such a link for data transfer, communications, imaging and so on.

Typically, a signal will be transmitted in the form of an acoustic signal or an optical signal. Use of an acoustic signal may be advantageous in certain circumstances, but disadvantageous in others. Similarly, use of an optical signal may be advantageous in certain circumstances, but disadvantageous in others.

It is an example aim of example embodiments of the present invention to at least partially overcome or avoid disadvantages associated with existing approaches to signal transmission and/or reception in a fluid, whether those disadvantages are discussed herein or elsewhere, or to at least provide a viable alternative.

According to a first aspect of the present invention, there is provided a method for transmitting and/or receiving an optical signal through a fluid, the method comprising: using a pressure wave to cause a change in refractive index in the fluid, the change in refractive index causing a waveguide to be formed; and transmitting and/or receiving the optical signal through the waveguide.

The change in refractive index may be an increase in refractive index sufficient to achieve total internal reflection of the optical signal within the waveguide.

The fluid may be a liquid.

The pressure wave may take the form of a Bessel-like beam.

The waveguide may be formed within the Bessel-like beam.

The waveguide may be formed in a central lobe of the Bessel-like beam.

The pressure wave may take the form of a standing wave.

The waveguide may be formed within the standing wave.

The waveguide may be formed between an origin of the standing wave and a first node of the standing wave.

An acoustic mirror may be used to form the standing wave

An acoustic mirror may be located at a first node of the standing wave.

A transducer system comprising one or more transducers may be used to generate the pressure wave.

A transducer system comprising an annular array of transducers may be used to generate the pressure wave.

The transducer system may comprise an acoustic impedance matching layer for the or each transducer, for matching the acoustic impedance of the or each transducer with the acoustic impedance of the fluid.

A laser may be used to generate and/or transmit the optical signal.

The method may comprise sensing a distance between a transmitter of the optical signal and a receiver of the optical signal.

2

The method may comprise one or both of generating the pressure wave and/or transmitting the optical signal only when the sensed optical distance is equal to or less than a threshold distance.

The method may comprise changing a property of the pressure wave to maintain or improve the transmission and/or reception of the optical signal based on the sensed distance.

According to a second aspect of the present invention, there is provided a system for transmitting and/or receiving an optical signal through a fluid, the system comprising: a transducer system, arranged to generate a pressure wave in the fluid to cause a change in refractive index in the fluid, the change in refractive index causing a waveguide to be formed; and an optical transmitter and/or receiver, arranged to transmit and/or receive the optical signal through the waveguide.

It will be appreciated that any one or more features described in relation to any particular aspect of the present invention may be used in place of, or in combination with, any one or more features of another aspect of the present invention, unless such replacement or combination would be mutually exclusive from the perspective of the skilled person from a reading of this disclosure. In particular, any one or more features described in relation to a method aspect may be used in combination with or in place of any one or more features described in relation to an apparatus or system aspect.

For a better understanding of the invention, and to show how embodiments of the same may be carried into effect, reference will now be made, by way of example, to the accompanying diagrammatic Figures in which.

Figure 1:
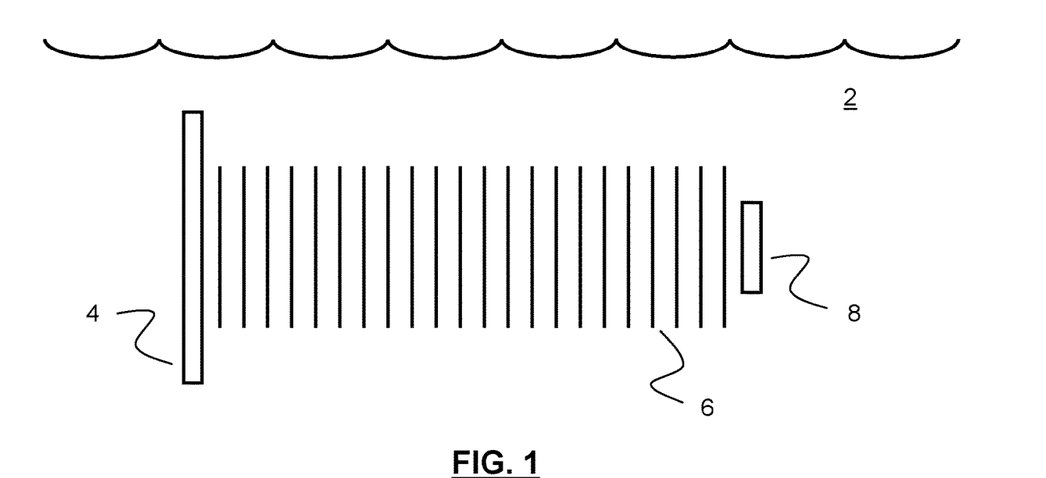
FIG. 1 schematically depicts transmission and reception of an acoustic signal in a fluid, according to a proposed approach.

FIG. 1 schematically depicts a proposed system and related methodology for transmitting a signal through a fluid 2. The fluid 2 might be a liquid, such as water.

A transducer system 4 is provided, for generating an acoustic signal in the form of a pressure wave 6. A receiver 8 is also provided for receiving the signal 6. The receiver 8 may also be an acoustic transducer.

As discussed above, the signal 6 may comprise data, or be used for imaging, or be used in one or a number of different applications. Various different applications can be envisaged.

While the system and methodology of FIG. 1 may work satisfactorily in certain conditions, there are disadvantages. Perhaps the main disadvantage is a data rate that is available when using a signal comprising a pressure or acoustic wave. The data rates, or similar, may simply not be high enough for use in certain applications. There is therefore sometimes a need to find an alternative system and methodology, where increased data rates or similar may be achievable.

Figure 2:
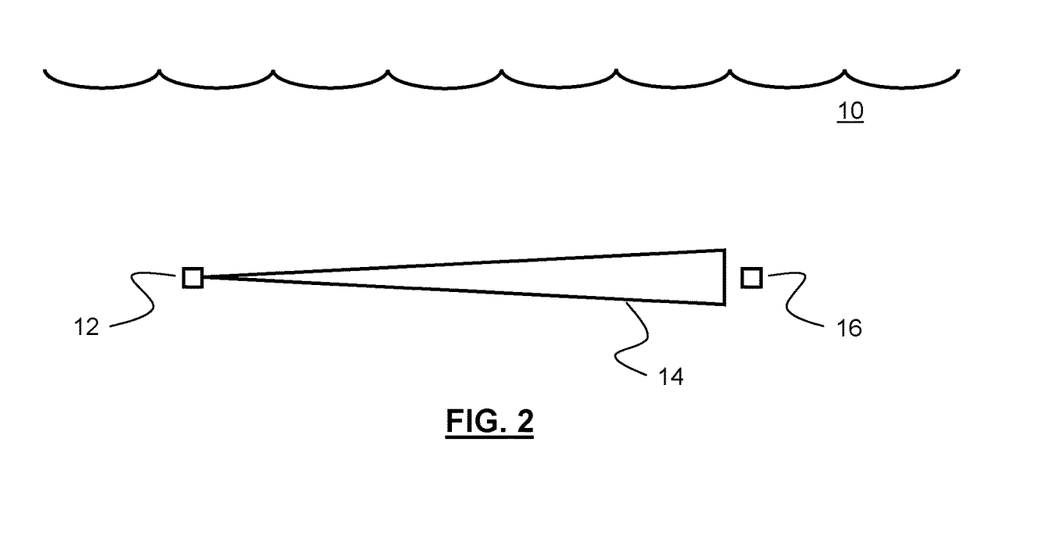
FIG. 2 schematically depicts transmission and reception of an optical signal in a fluid, according to another proposed approach.

FIG. 2 schematically depicts another proposed system and methodology for transmitting a signal through a fluid 10. The fluid 10 might be a liquid, such as water.

The system comprises an optical emitter 12, for example a laser (e.g. in the form of one or more laser diodes). A laser might be used in a high data rate system. An optical signal 14 is emitted by the optical emitter 12. An optical receiver 16 is arranged to receive the signal 14. The receiver 16 might be or comprise one or more photodiodes or similar.

The use of an optical signal 14 might be advantageous over, for example, an acoustic or pressure wave signal as described in relation to FIG. 1. This is because a higher data rate may be achieved using an optical signal 14, as opposed to a pressure wave or acoustic wave.

However, the signal 14 may not efficiently or effectively propagate through the fluid 10, and might instead undergo some form of dispersion or scattering as a result of the fluid 10, or particles or other components located within that fluid 10. For instance, the signal transmission and reception described herein will typically not be undertaken in a laboratory environment, where the fluid 10 is formed of only a single component and is motionless. In practice, for example, the fluid 10 may be a liquid, such as sea water or similar, comprising one or more components in addition to water, as well as the fluid being subjected to turbulence, changes in temperature, and so on, all of which may negatively affect propagation of the optical signal 14.

While an acoustic signal might not suffer from such dispersion or propagation problems, or at least to the extent that an optical signal would, an acoustic signal will nevertheless not be able to convey as much data, or at least data with a sufficient rate, as an optical signal. Therefore, there is a need to in some way benefit from the advantages of the different systems and methods of FIGS. 1 and 2, while at the same time minimising or avoiding the disadvantages associated with those systems and methods.

According to the present invention, there is provided a method, and related system, for transmitting and/or receiving an optical signal through a fluid. The method comprises using a pressure wave to cause a change in the refractive index in the fluid. The change in refractive index is introduced to cause a waveguide to be formed in the fluid. The method also comprises transmitting and/or receiving an optical signal through that waveguide.

The concept underlying the present invention is simple but powerful. The present invention takes advantage of the benefits of proposed systems and methods, while being specifically arranged to avoid many if not all of the disadvantages. So, the benefit of effective propagation of an acoustic or pressure wave in a fluid can be taken advantage of to establish a useful and reliable waveguide in the fluid. However, a pressure wave is not then used to transmit a signal within that waveguide or through the fluid in general. Instead, that waveguide is then used to transmit and/or receive optical signal. An optical signal can transfer data at a much higher rate than, for example, a signal transmitted or received in the form of a pressure or acoustic wave. At the same time, though, the presence of the waveguide means that the problems discussed above in relation to dispersion, etc., of an optical signal in the fluid are largely overcome.

Figure 3:
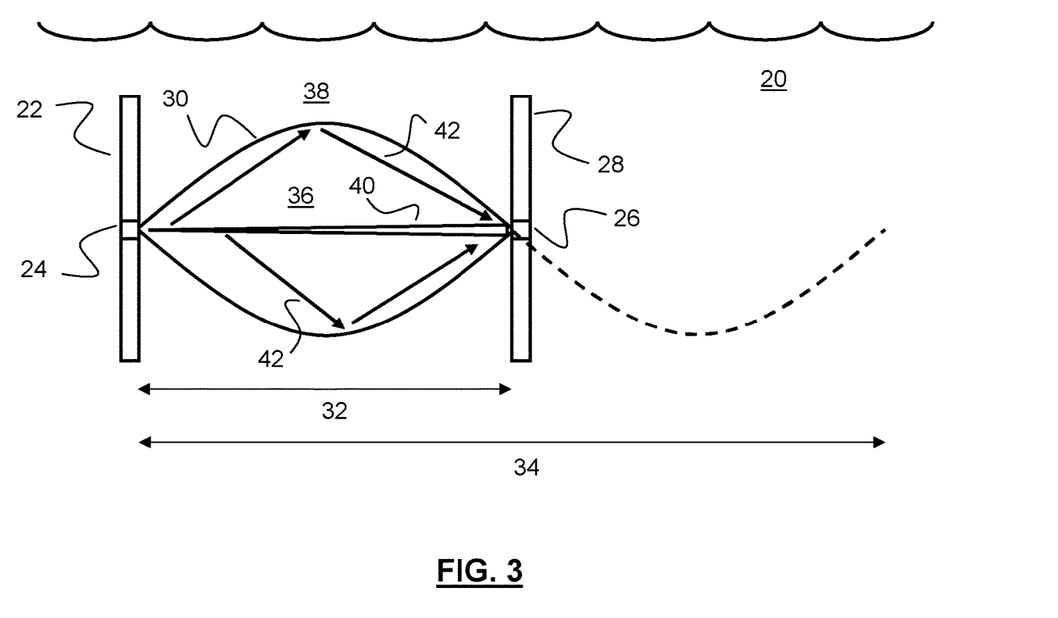
FIG. 3 schematically depicts a methodology and system of transmitting and/or receiving an optical signal through a fluid according to an example embodiment.

FIG. 3 schematically depicts a system and methodology according to an embodiment of the present invention. The system is shown as being located within a fluid 20, such as a liquid, for example sea water or similar.

The system comprises a transducer system 22, for example in the form of a transducer array. At, or within the vicinity of the transducer array 22, an optical emitter 24 is provided. Remote from the transducer system 22 and optical emitter 24, there is provided an optical receiver 26 and an acoustic mirror 28.

As above, the optical emitter and receiver 24, 26 might be used to form some sort of link or connection within the fluid. For example, it may be necessary to establish such a link for data transfer, communications, imaging and so on.

The transducer array 22 is used to generate a pressure wave 30. In particular, and using the acoustic mirror 28, the pressure wave 30 takes the form of a standing wave. The standing wave 30 therefore extends between the transducer array 22 and the acoustic mirror 28, such that first node of the standing wave 30, remote from the origin of the wave 30, is located at the location of the acoustic mirror 28. In other words the standing wave 30 takes the form of half a wavelength 32 of a total wavelength 34 of the wave generated by the transducer array 22.

The pressure wave 30 is configured to increase the refractive index 36 within the standing wave 30, in comparison with the refractive index 38 of the fluid 20 in general outside of the pressure wave 30.

Any increase in refractive index 36 within the standing wave 30 may be sufficient to form a useful waveguide for use in the transmitting and/or receiving an optical signal 40 emitted by the optical emitter 24, and/or any associated scattered, deflected, diffracted, reflected or so on related components 42. Indeed, the change in refractive index may be sufficient to achieve total internal reflection of the optical signal 40 (or associated components 42, such as those referred to above) within the waveguide formed by the pressure wave 30.

As discussed above, the establishing of a waveguide for transmission and/or reception of an optical signal allows, or better allows, for optical communications or links to be established and maintained within a fluid.

It is worth noting that, in general, a standing wave pressure level will oscillate from a zero to a peak midway between the source or generator of the wave and the acoustic mirror. So, even if the location of the peak remains substantially spatially constant over time, an optimal waveguide effect will likewise fluctuate in time due to the change in amplitude of the pressure level. Therefore, it may be advantageous, in order to achieve satisfactory signal transmission or reception, to synchronise the signal transmission and/or reception (or the signal in general) with the fluctuation in acoustic levels (beating), in order to optimise the guiding effect.

Figure 4:
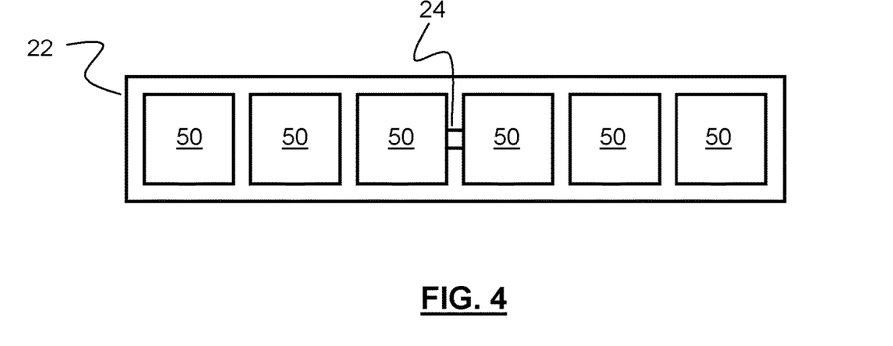
FIG. 4 schematically depicts a transducer system suitable for generating a pressure wave for use in the example embodiment of FIG. 3.

FIG. 4 shows how the transducer system 22 may take the form of, for example, a one-dimensional array of transducers 50. FIG. 4 also shows that the optical emitter 24 might be conveniently or practically located within a general centre of the transducer system 22.

In related embodiments, the transducer system may comprise one transducer, more than one transducer, a one-dimensional array of transducers, or a two dimensional array of transducers, as appropriate to the requirements of the wave that is needed from the waveguide. For instance, the transducer system may be dependent on power requirements, spatial dimensions of the wave or between components of system and so on. Any suitable transducer may be used, appropriate to required conditions, pressure levels, and so on. An air gun might be a suitable transducer.

Figure 5:
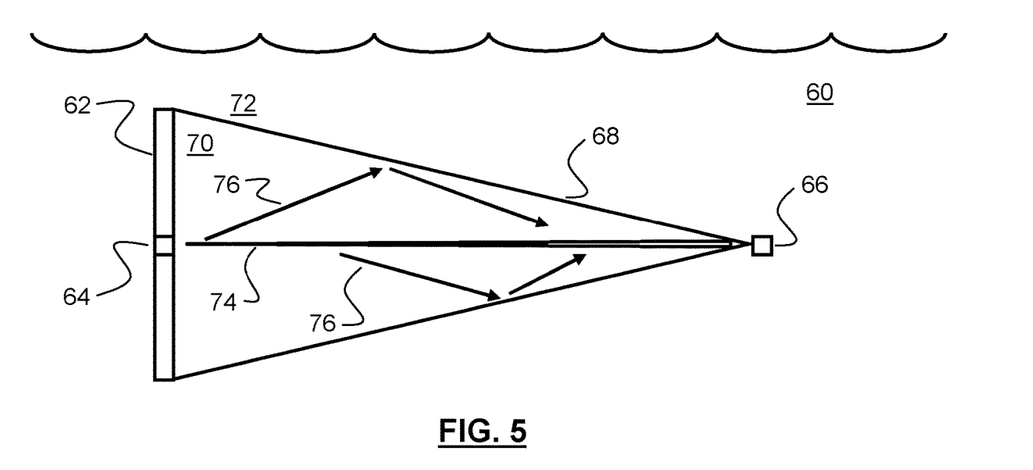
FIG. 5 schematically depicts a methodology and system for transmitting and/or receiving an optical signal in a fluid, according to a different example embodiment.

FIG. 3 shows how an underwater (or more generally, within a fluid) optical communication link can be efficiently and effectively established by way of a free-space waveguiding method and system. However, use of a standing wave in order to establish and maintain a waveguide is not the only implementation. Any change in refractive index of any kind which can result in waveguiding of any form may be used to at least partially improve the transmission or reception of the optical signal in a fluid. FIG. 5 shows an alternative example of waveguide formation and use.

Referring to FIG. 5, a system is, again, shown as being located within a fluid 60. The system includes a transducer system 62, for example in the form of a transducer array or similar. Located at, or adjacent to, or in the vicinity of, the transducer system 62 is an optical emitter 64, for example in the form of a laser, such as a laser diode. The system also comprises an optical receiver 66.

In use, the transducer system 62 is used to generate a pressure wave in the form of a Bessel-like beam 68 (i.e. a beam approximating to a Bessel beam), sometimes referred to as a Bessel wave or Bessel beam. The pressure wave 68 in the form of the Bessel-like beam 68 is generated to cause a change in refractive index within the Bessel-like beam 68 (or, in this example, at least within a central or main lobe of the Bessel-like beam 68). The change is such that the refractive index 70 within the Bessel-like beam 68 is increased in comparison with the refractive index 72 of the fluid 60 in general.

As with the system methodology of FIG. 3, with the Bessel-like beam implementation of FIG. 5, any increase in refractive index within the beam may be sufficient to improve the transmission and/or reception of an optical signal 74 travelling through the fluid 60 (e.g. a signal 74 emitted by the emitter 64). More particularly, if the change in refractive index is an increase within the beam 68 that is sufficient to achieve total internal refraction within the waveguide formed by the beam 68, the transmission and/or reception of the optical signal 74 may be further improved. This might include transmission and/or reception of the signal 74 in general, but also related scattered, refracted, reflected or otherwise deflected components 76 relating to the (main) optical signal 74.

Figure 6:
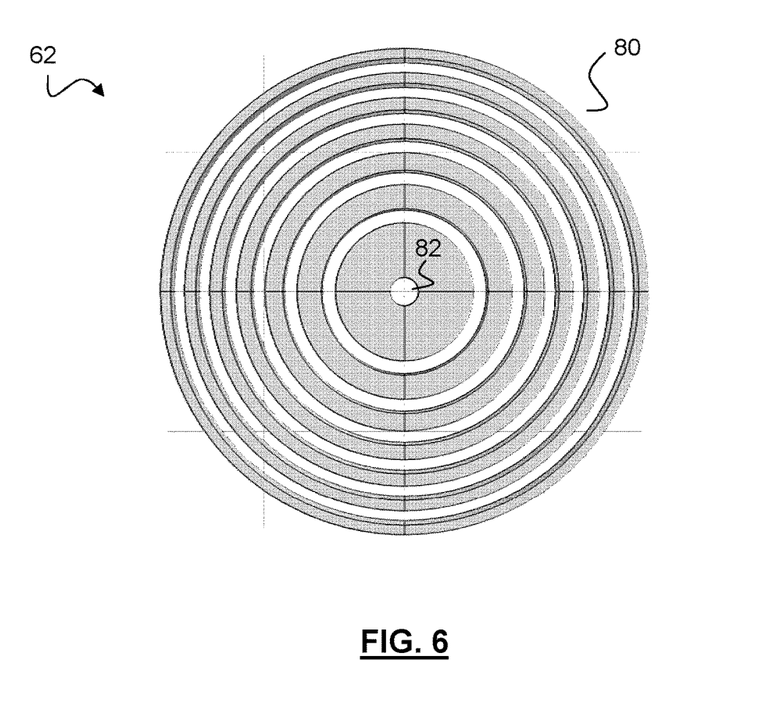
FIG. 6 schematically depicts a transducer system suitable for generating a pressure wave for use in the example embodiment of FIG. 5.
Figure 7:
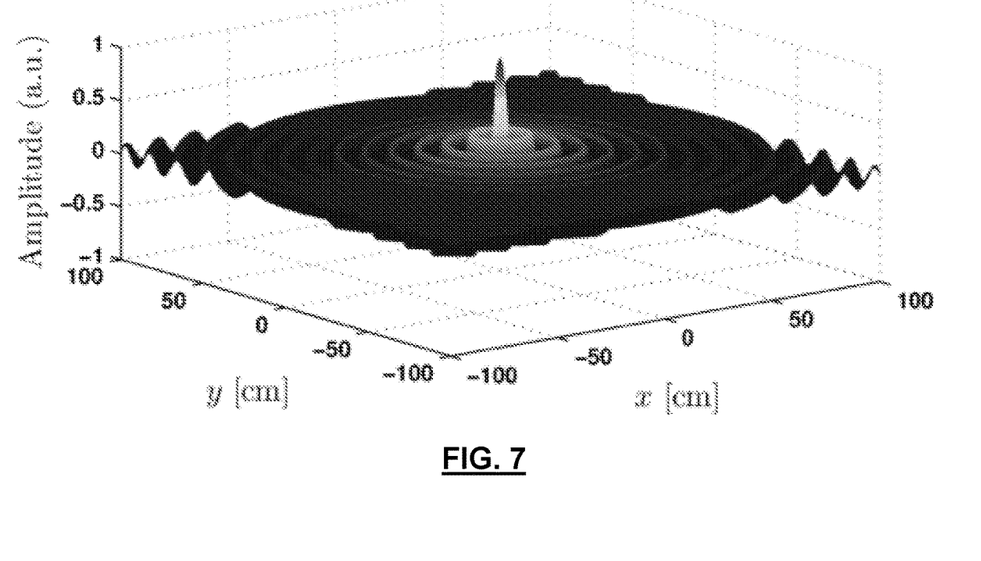
FIGS. 7 to 10 schematically depict amplitude profiles of pressure waves generatable by the transducer system of FIG. 6, and/or usable in the methodology and system of FIG. 5.
Figure 8:
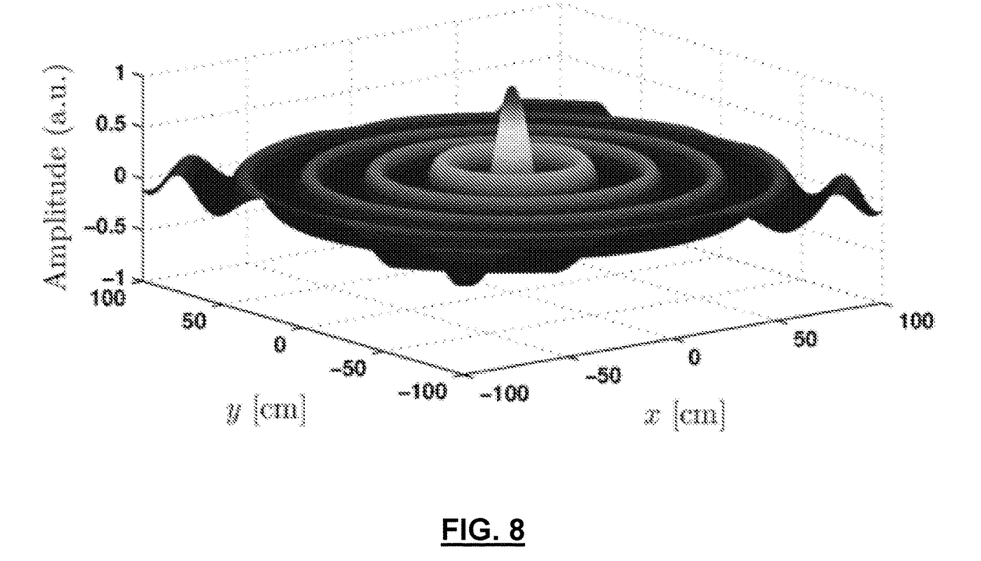
Figure 9:
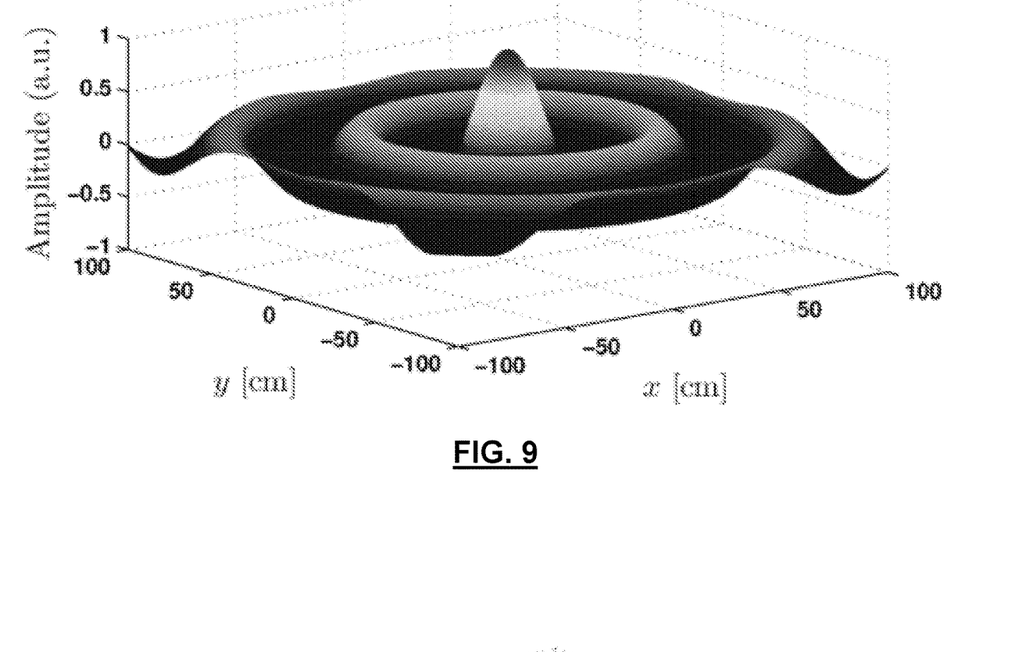
Figure 10:
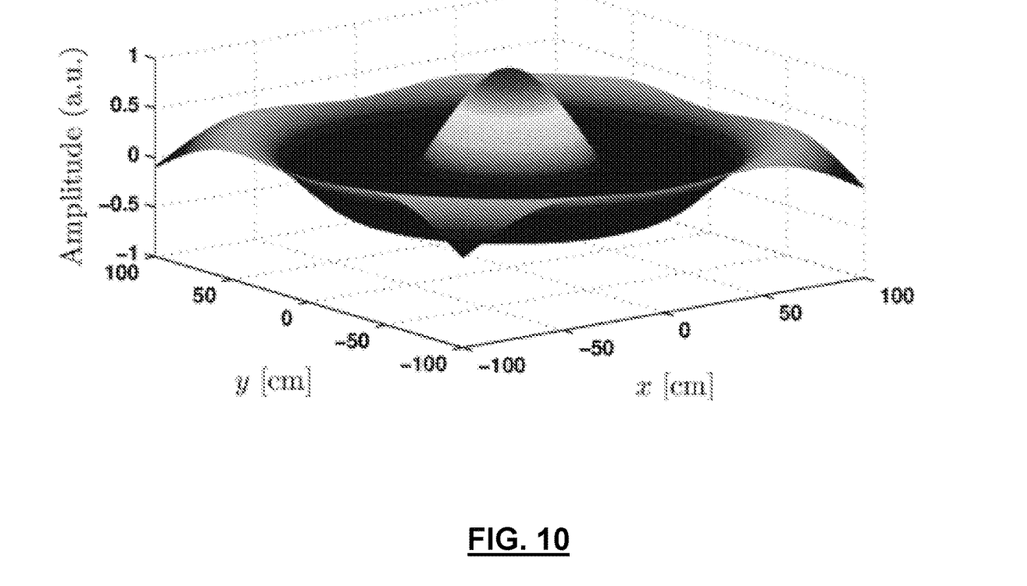
Figure 11:
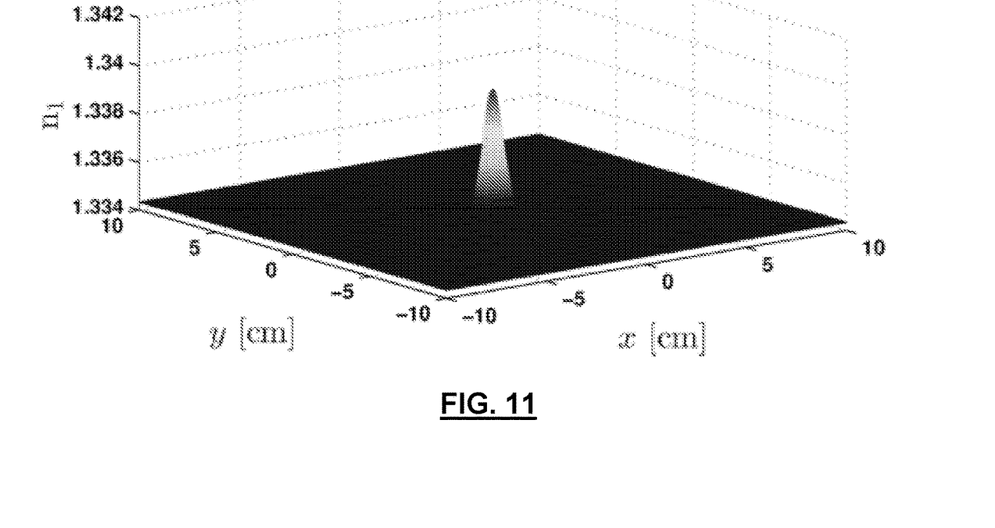
FIGS. 11 to 14 schematically depict refractive index profiles of pressure waves generatable by the transducer system of FIG. 6, and/or usable in the methodology and system of FIG. 5.
Figure 12:
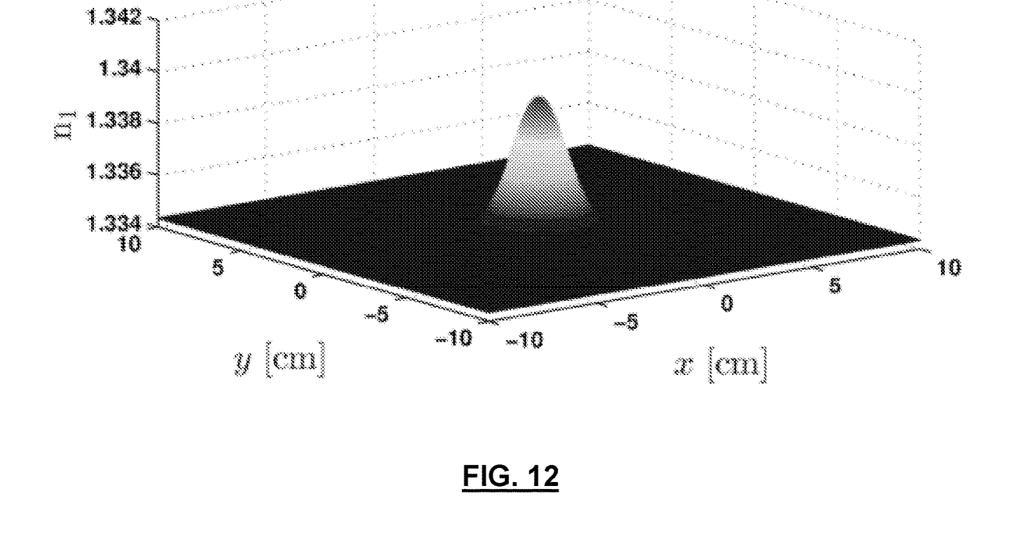
Figure 13:
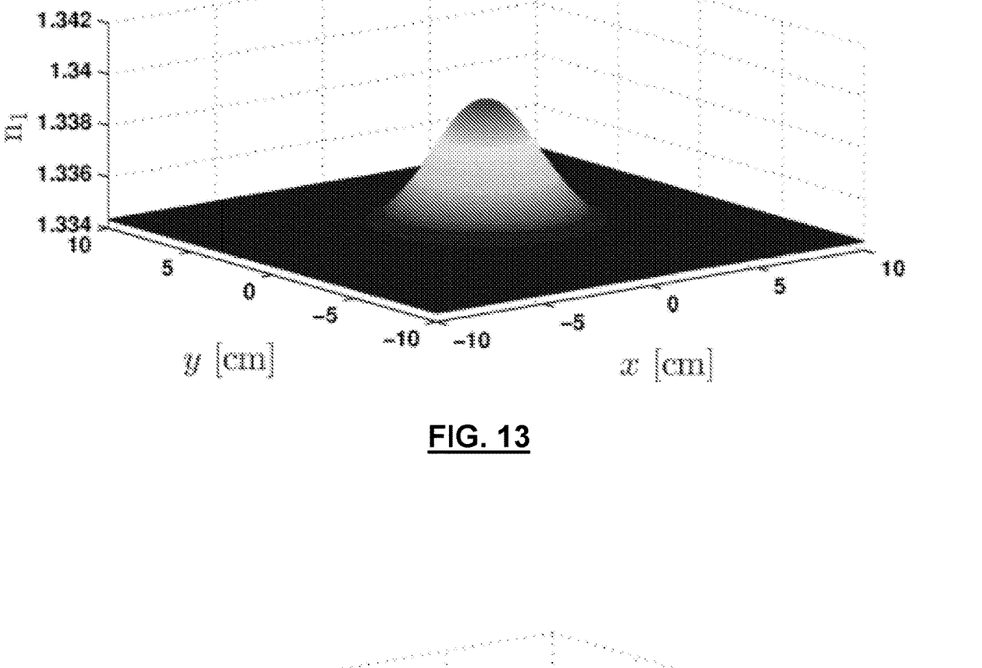
Figure 14:
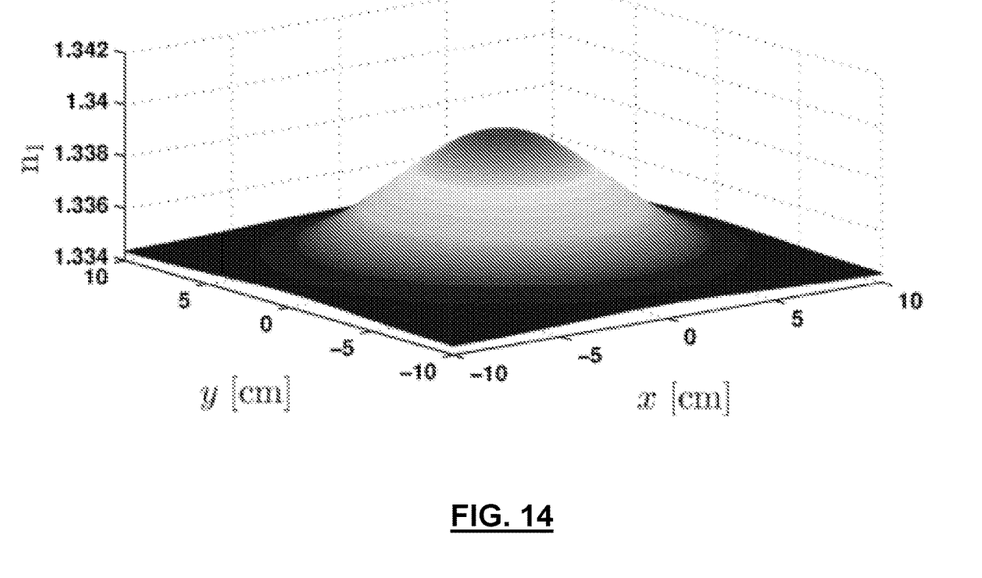

FIG. 6 shows how a Bessel-like beam may be generated by a transducer system 62 formed from an annular array of transducers 80. Each transducer of the array typically has substantially the same transducer area as other transducers in the array 80, in order to generate the Bessel-like beam.

The exact dimensions of the transducer system 62, including the number and dimensions of the transducers 80 forming part of the transducer system 62, can be varied to suit the particular implementation, for example in terms of the required power, the spacing between components of the overall system (e.g. transmitter and receiver), spatial dimensions that are required for the beam, and so on.

A central transducer of the array of transducers 80 might be provided with a hole or aperture 82, which could be a convenient location for a centrally located optical emitter, such as that shown and described with reference to FIG. 5. Depending on how the Bessel-like wave or beam is generated, the most central transducer might not actually be an annulus, but could be a disc or similar, and the optical emitter located on top of that disk or similar.

In another example, a Bessel-like wave or beam could be achieved using a narrow annular slit, or by a conically shaped element (axicon). However, an annular transducer array seems to give the most beneficial implementation.

FIGS. 7 to 10 show how different Bessel-like beams or beam profiles can be readily generated, either with different amplitudes, or with different spatial properties of the main, central lobe which would typically be used to form the waveguide described above. The exact details of the different plots shown in FIGS. 7-10 are not particularly important, other than to demonstrate the way in which different Bessel-like beams can be provided by different systems or configurations of those systems.

Similarly, FIGS. 11 to 14 show related plots of changes in refractive indices within a central lobe of a generated Bessel-like beam. Again, the exact details are not particularly important, other than to show that the refractive indices can be controlled in order to appropriately establish or control properties of a waveguide, as described above.

The standing wave example of FIG. 3, and the Bessel-like wave or beam example of FIG. 5, might be viewed as differing practical implementations of the present invention. Both could be used in practice, depending on the required performance of the system or method as a whole, and the required application.

In certain circumstances, the standing wave implementation might be preferred, and in another example the Bessel-like wave or beam implementation might be preferred. For instance, the standing wave implementation might not always be suitable, since the distance between the source or generation of pressure waves and the opposing acoustic mirror needs to be known or determined in order to calculate and implement the standing wave criteria. Also, and necessarily, a dedicated acoustic mirror might be required in order to establish the standing wave (e.g. as opposed to one incidentally present in the form of an appropriate opposing surface). The generation of the standing wave is also not particularly directional, and higher (the Bessel-like examples) acoustic power might be required to generate the standing wave. For one or more of these reasons, it might well be that the Bessel-like wave or beam implementation might be preferred, since there is no need to accurately know the distance between pressure wave source and optical receiver in order to establish a standing wave or similar. There is also no need for an acoustic mirror. The Bessel-like wave or beam is far more directional (due to its propagation-invariant nature), and, in general, requires lower power to generate and implement (compared with the standing wave example). In an alternative view, the standing wave frequency might be far lower than the frequency of the Bessel-like wave or beam. If it is disadvantageous, for whatever reason (e.g. propagation or environmental or ecological considerations), to use a high frequency pressure wave, then perhaps the standing wave implementation might be preferred.

Generally, it is felt that the Bessel-like wave implementation is preferred, since there are generally more advantages associated with its use and implementation.

The embodiments described above have been generally shown as being static in nature, with a beam of a particular profile, or having particular properties, established and maintained. For example, in the standing wave implementation, the distance between pressure wave source and acoustic mirror might be known in advance and so the entire system can be set up with this known parameter in mind. However, in a more flexible implementation, it might be possible or required to evaluate or determine the distance between the pressure wave generator or source (which equates to the location of the optical emitter) and the acoustic mirror (which generally approximates to the location of the optical detector or receiver). This determination of distance could be achieved in any one of a number of ways, for example optically or acoustically. Using an optical technique might work in certain circumstances, but might encounter problems due to optical scattering, light (e.g. solar) background levels, and so on. Typically, the optical distance finding measurement would be undertaken using time-of-flight measurements. Use of acoustic distance determination would typically be easier to implement, and could in fact be used by the transducer array that is also used to generate the pressure wave that is used in waveguide formation. The distance could also be determined, acoustically, by a time-of-flight measurement, for example using the echo or similar of the acoustic signal that is generated. The same transducer array could be used to both generate and detect the pressure wave that is used for the distance determination. Power levels for this determination would typically be far lower than those required for the generation of the pressure wave needed for waveguide formation.

Depending of the distance determination or knowledge of distance in advance, the system could be adjusted to control operating properties in response to that distance, for example the operating acoustic frequency, power, wave/beam shape, and so on. This could typically be undertaken rather easily using the standing wave implementation, by tuning the frequency to maintain the required conditions to establish a standing wave. This might be an advantage of the standing wave implementation. A degree of tuning might be possible with the Bessel-like beam or wave implementation, for example power levels and similar, but general control or re-configuration might be more difficult. This is due to, for example, adjustments that would be required in the annular array geometry that would typically also be tuned in order to maintain a well collimated Bessel-like beam at different acoustic frequencies. So, at least to this extent, this might be a disadvantage of the Bessel-like wave in certain circumstances. That said, the Bessel-like wave implementation also has flexibility in terms of its general physical principles, in that so long as the distance between pressure wave generation (generally similar to the location of the optical emitter) and optical detector are less than the depth of field (DOF) of the Bessel-like beam, the waveguide should function sufficiently well for the optical transmission and/or reception of a signal to be improved (in comparison with there being no waveguide at all, for instance).

Figure 15:
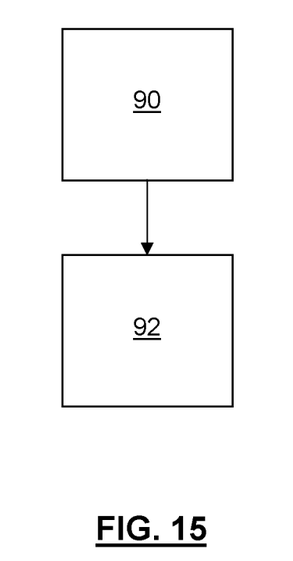
FIG. 15 schematically depicts general methodology associated with example embodiments.

FIG. 15 is used to describe general methodology associated with the present invention. The method generally leads to transmitting and/or receiving an optical signal through a fluid. The method comprises using a pressure wave to cause a change in refractive index in the fluid, the change in refractive index causing a waveguide to be formed 90 in the fluid. The method also comprises transmitting and/or receiving the optical signal trough the waveguide 92. Typically, it is expected that the waveguide will be formed 90 before the optical signal is transmitted 92. However, it is of course possible that the optical signal is transmitted in advance, and the waveguide is then established to improve or maintain the transmission and/or reception of the optical signal.

The generation of the pressure wave and/or the transmission and/or reception of the optical signal may be based on the determination of distance between the optical emitter/pressure wave source and optical detector/acoustic mirror or similar. One or more components of the system may be configured to improve or maintain the establishment or properties of the waveguide, or transmission and/or reception of the optical signal.

Figure 16:
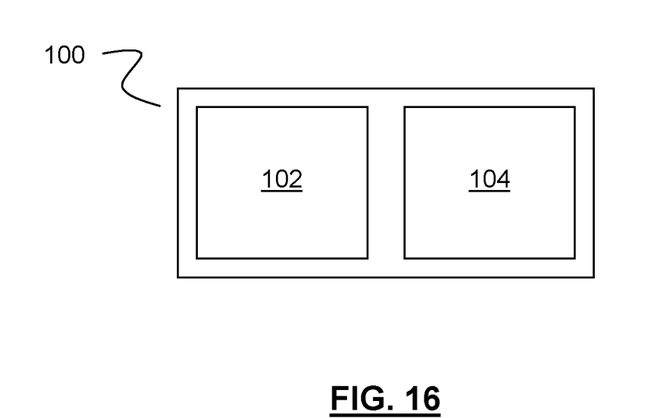
FIG. 16 schematically depicts general system principles associated with example embodiments.

FIG. 16 schematically depicts a general overview of principles of a system for implementing methodology described herein. The system 100 generally comprises a transducer system 102 for generating a pressure wave in a fluid to cause a change in refractive index in that fluid. The change in refractive index causes a waveguide to be formed in that fluid. The system also comprises an optical transmitter and/or receiver 104, arranged to transmit and/or receive the optical signal through the waveguide that has been formed.

The transducer system described herein might comprise an acoustic impedance matching layer for the transducers forming part of the system. The impedance matching layer may be used to match the acoustic impedance of the transducer with the acoustic impedance of the fluid, to improve acoustic performance of the system or method as a whole.

It is worth noting that exact power levels, frequencies, refractive indices, and so on have not been provided in particular detail. This is because such values will vary depending on the implementation of the invention, in particular with regard to what fluid the system is used in or the method is applied to, the spatial dimensions of the system, the optical signals that are used, and so on. Such implementation details will be apparent to the skilled person once the present disclosure has been read and understood, for example the configuration of a transducer array required to establish a particular standing wave in a particular system in a particular fluid, and so on. These are very particular implementation details, as will be appreciated, and are not required to understand or implement the general principles underlying the invention. In other words, the invention is not that a pressure wave can change the refractive index of a fluid, or the realisation that optical signals cannot always propagate effectively or efficiently in a fluid, or that acoustic signals are not effective at transmitting data at high enough rates. To reiterate the above, the concept underlying the present invention is simple but powerful. The present invention takes advantage of the benefits of proposed systems and methods, while being specifically arranged to avoid many if not all of the disadvantages. So, the benefit of effective propagation of an acoustic or pressure wave in a fluid can be taken advantage of to establish a useful and reliable waveguide in the fluid. However, a pressure wave is not then used to transmit a signal within that waveguide or through the fluid in general. Instead, that waveguide is then used to transmit and/or receive optical signal. An optical signal can transfer data at a much higher rate than, for example, a signal transmitted or received in the form of a pressure or acoustic wave. At the same time, though, the presence of the waveguide means that the problems discussed above in relation to dispersion, etc., of an optical signal in the fluid are largely overcome. The exact implementation details will, of course, depend on the exact application.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method for transmitting and/or receiving an optical signal through a fluid, the method comprising:
   using a pressure wave to cause a change in refractive index in the fluid, the change in refractive index causing a waveguide to be formed; and
   transmitting and/or receiving the optical signal through the waveguide;
   wherein the waveguide is formed between a source of the optical signal and a receiver of the optical signal, and the optical signal propagates along a length of the waveguide between the source and the receiver.

2. The method of claim 1, wherein the change in refractive index is an increase in refractive index sufficient to achieve total internal reflection of the optical signal within the waveguide.

3. The method of claim 1, wherein the fluid is a liquid.

4. The method of claim 1, wherein the pressure wave takes the form of a Bessel-like beam, and the waveguide is formed within the Bessel-like beam.

5. The method of claim 4, wherein the waveguide is formed in a central lobe of the Bessel-like beam.

6. The method of claim 1, wherein the pressure wave takes the form of a standing wave, and the waveguide is formed within the standing wave.

7. The method of claim 6, wherein the waveguide is formed between an origin of the standing wave and a first node of the standing wave.

8. The method of claim 7, wherein an acoustic mirror is used to form the standing wave, the acoustic mirror being located at the first node of the standing wave.

9. The method of claim 1, wherein a transducer system comprising one or more transducers is used to generate the pressure wave.

10. The method of claim 9, wherein the transducer system comprising an annular array of transducers is used to generate the pressure wave.

11. The method of claim 9, wherein the transducer system comprises: a transducer; and an acoustic impedance matching layer for the transducer, for matching the acoustic impedance of the transducer with the acoustic impedance of the fluid.

12. The method of claim 1, wherein a laser is used to generate and/or transmit the optical signal.

13. The method of claim 1, wherein the method comprises:
    sensing a distance between the source of the optical signal and the receiver of the optical signal; and
    one or both of generating the pressure wave and/or transmitting the optical signal only when the sensed optical distance is equal to or less than a threshold distance.

14. The method of claim 1, wherein the method comprises:
    sensing a distance between the source of the optical signal and the receiver of the optical signal; and
    changing a property of the pressure wave to maintain or improve the transmission and/or reception of the optical signal based on the sensed distance.

15. A system for transmitting and/or receiving an optical signal through a fluid, the system comprising:
    a transducer system, arranged to generate a pressure wave in the fluid to cause a change in refractive index in the fluid, the change in refractive index causing a waveguide to be formed; and
    a first optical transmitter or receiver, arranged to transmit or receive the optical signal through the waveguide;
    wherein the waveguide is formed between the first optical transmitter or receiver and a second optical transmitter or receiver, and the optical signal propagates along a length of the waveguide between the first optical transmitter or receiver and the second optical transmitter or receiver.

16. The system of claim 15, wherein the change in refractive index is an increase in refractive index sufficient to achieve total internal reflection of the optical signal within the waveguide.

17. The system of claim 15, wherein the pressure wave takes the form of:
    a Bessel-like beam, and the waveguide is formed within the Bessel-like beam; or
    a standing wave, and the waveguide is formed within the standing wave.

18. A system for transmitting an optical signal through a fluid, the system comprising:
    an array or transducers arranged to generate a pressure wave in the fluid to cause a change in refractive index in the fluid, the change in refractive index causing a waveguide to be formed in the fluid, wherein the optical signal is transmitted through the waveguide, wherein the waveguide is formed between a source of the optical signal and a receiver of the optical signal; and
    an aperture through which the optical signal passes into the waveguide.

19. The system of claim 18, wherein the array or transducers is an annular array or transducers, and the aperture is located within the annular array.

20. The system of claim 18, wherein in addition to generating the pressure wave, the array of transducers is arranged to both generate and detect an acoustic signal that is used for a distance determination, the distance determination to determine a distance between an optical transmitter of the optical signal and a remote optical receiver of the optical signal, wherein the determined optical distance is used to determine at least property of the pressure wave.

* * * * *